July 13, 1965 F. ULRICH 3,195,019

MULTISTABLE STORAGE DEVICE

Filed Dec. 29, 1961

INVENTOR
FRIEDRICH ULRICH

BY [signature]
ATTORNEY

United States Patent Office 3,195,019
Patented July 13, 1965

3,195,019

MULTISTABLE STORAGE DEVICE

Friedrich Ulrich, Stuttgart-Bad Cannstatt, Germany, assignor to International Standard Electric Corporation, New York, N.Y., a corporation of Delaware Filed Dec. 29, 1961, Ser. No. 163,314
Claims priority, application Germany, Jan. 4, 1961, St 17,311
6 Claims. (Cl. 317—148.5)

The present invention relates to a multistable storage device capable of performing the temporary storing of successive incoming information items in the shape of pulses, or of transferring each time only one, e.g., every tenth pulse, of incoming trains of pulses, via its output. These problems often arise in data-processing systems. To this end, chain circuits of various types have been found particularly suitable using either fed-back transistor switching circuits or ferrites for performing the storing operation.

If correspondingly designed, the well-known transistorized chain circuits are sufficient to meet the usual requirements, but they are rather expensive in view of the relatively high number of transistors required. Ferrite-core circuits (arranged as shift registers) are also expensive in view of the relatively high number of transistors required. Ferrite-core circuits (arranged as shift registers) are likewise expensive in view of the required windings on the individual cores and, in addition thereto, can only be operated dynamically.

Multistable transistor circuits are known in which the output voltage is changed in a step-by-step manner in dependence upon the number of incoming pulses. These types of storage circuits operating with the step-shaped current-voltage characteristic of a network consisting of diodes and resistors, however, are less expensive, but have a very high steady-current consumption due to the necessary voltage dividers. In addition thereto they have the disadvantage that the output voltage has to be measured in the various partial ranges (sub-ranges).

For effecting storage, it is also known to use the stepwise magnetization of a rectangular ferrite (counting transfluxor), or the charging of a capacitor in a step-by-step manner. For effecting the defined changing of the conditions, there are required narrow-tolerance voltage-time or current-time integrals. In addition thereto, sensitive types of indicators have to be provided for indicating the final or end condition, so that also these types of storage arrangements appear to be relatively expensive.

Other conventional types of arrangements, such as delay-line circuits, dynamic chain circuits, etc., have the disadvantage of permitting a limited practical application only.

It is the object of the present invention to provide a multistable storage device which avoids the disadvantages of the conventional types of storage arrangements and which, above all, only requires a small technical investment. According to the invention, it is possible to obtain a multistable storage device with the required properties by providing that the pulses to be stored are fed to a trigger circuit which is adapted to supply a series connection consisting of several tunnel diodes operated by different peak currents, that in the case of a current rise in excess of the peak current of any random tunnel diode a voltage jump will appear in the series circuit by which the trigger circuit is immediately reset, but in the course of which a basic current remains to be impressed upon the series circuit, which is higher than the greatest valley current, but lower than the smallest peak current of all series-connected tunnel diodes, and that an output signal is only produced by the trigger circuit after a predetermined number of pulses have been received. Since the employed chain circuit consisting of several tunnel diodes has several stable conditions or states, it is possible to perform this reciprocal operation until the last tunnel diode has exceeded the peak current value. Based on this principle, it is possible to design a variety of storage devices. When inserting the indicator of the storage device into the same circuit as the tunnel diodes, then in the case of $n$ series-connected tunnel diodes, this indicator will respond after the $(n+1)$-st pulse. According to a further embodiment of the invention, the trigger circuit is reset by the $(n+2)$-nd pulse, thus transmitting a pulse at one output of the trigger circuit. In the course of this, the condition of the multistable storage device may be read out from the chain circuit. According to the invention the counting rate of the storage device can be changed by shorting one or more of the tunnel diodes, or in that the voltage jump of any random tunnel diode can be used selectively for effecting either the resetting of the trigger circuit or the transmission of an output pulse by simultaneously resetting the storage device. The arrangement can also be made in such a way that the voltage jumps of individual tunnel diodes are additionally transmitted as an output signal without causing a resetting of the storage device. In accordance with a further embodiment of the storage device, it is proposed to impress a certain current upon the series connection, by which the storage device is previously set to a certain value.

For the trigger circuit of this storage device, it is of advantage to use a flip-flop type of transistor circuit in which, in the normal condition, a basic current is impressed upon the series arrangement of the tunnel diodes, via a transistor, which basic current is greater than the greatest valley current, but smaller than the smallest peak current of all of the inserted tunnel diodes, and in which the other transistor is fully conducting when in the normal condition. The pulses provided for the storage purpose are fed to the input of the trigger circuit. They are short and only slightly positive, so that the current in the transistor, which is adapted to feed the series circuit, will not drop below the value of the greatest valley current. After one pulse, due to the effect of the storage capacitors in the trigger circuit, the transistor feeding the series circuit will immediately become fully conducting, and the current in the series circuit itself, due to an additionally provided time-delay circuit, will increase more slowly, whereas the other transistor of the trigger circuit will not remain conducting. If the current passing through the series circuit reaches the value of peak current of a not-yet-reversed tunnel diode, then a voltage jump will appear in the series circuit, which is only permitted to become effective via the connected storage capacitor of the trigger circuit. Accordingly, the trigger circuit is immediately reset to the normal condition. After having reassumed the normal condition, the one transistor will again feed the series circuit with the impressed basic current, so that the potential conditions will remain in the series circuit. When using a relay winding as the time-delay arrangement, which is inserted as well into the series circuit, then this relay will only operate if the current in the series circuit will assume its final value after the $(n+1)$-st pulse, and if there is effected no resetting of the trigger circuit. According to the invention the resetting of the trigger circuit can be effected by blocking the transistor in the series circuit, or by interrupting the basic current in the series circuit. According to a further embodiment of the storage device, it is possible to provide an automatic resetting of the trigger circuit also after the $(n+2)$-nd pulse. In the course of this, the transistor of the series circuit is momentarily blocked by the discharge voltage of the storage capacitor of the other transistor. In this case the trigger circuit transmits this discharge voltage at one output in the form of an output signal. Upon termination of the discharge time, the transistor in the series circuit will again deliver the basic current for the tunnel diodes, whereas the other transistor will remain fully conductive (unblocked). It is possible to read out the condition of the inventive type of storage device at the series connection of the tunnel diodes in that the voltage drop at each tunnel diode is measured either individually or in common with respect to all tunnel diodes. The voltage jump appearing at a tunnel diode may now also be utilized for controlling individual processes. This affects neither the trigger circuit nor the series circuit.

In the following, the invention will now be explained in detail, with reference to an example of embodiment shown in FIGS. 1 and 2 of the accompanying drawings, in which.

Figure 1:
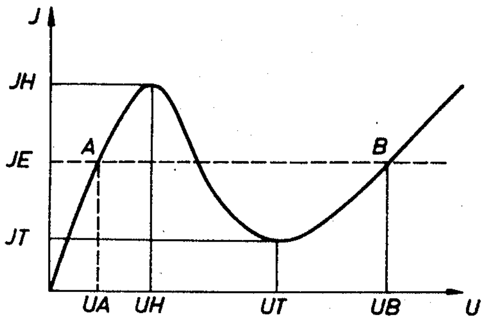
FIG. 1 shows the characteristic of a tunnel diode.

FIG. 1 shows the forward characteristic of a tunnel diode. In the case of very small voltages, there is effected a very sharp rise of the current passing through the tunnel diode. At a voltage UH this current reaches its maximum value, namely the peak current JH. This current decreases again as the voltage increases, and reaches a minimum value, namely the valley current JT, and then continuously increases again. The peak current JH of a tunnel diode is practically temperature-independent, and can be extensively varied by providing different types of diodes. In this way, it is possible to obtain values ranging from milliamperes to amperes. In the case of an impressed current JE which is denoted in FIG. 1 by the dashlines, it is possible for the tunnel diode to assume two stable operating points, e.g., point A and point B. This, however, is only applicable if the impressed current JE is greater than the valley current JT, but smaller than the peak current JH. If the current passing through the tunnel diode (e.g., from point A) is momentarily increased in excess of the peak current value, then the potential at the tunnel diode will jump from a value UA to a value which is determined by the magnitude of the current, and which is greater than the value UB. The decreasing of the current to the basic current value JE will cause a transition to the operating point B. This jump of potential which is caused by exceeding the peak current may now be utilized for a multistable storage device. To this end, several tunnel diodes are connected in series, and are inserted into the output circuit of a trigger circuit. The pulses to be stored serve to control the trigger circuit. After each pulse, the basic current JE is increased in the series circuit. As soon the the current reaches the value of a peak current, there is produced the voltage jump as already mentioned hereinbefore. This voltage jump is used for effecting an immediate reseting of the trigger circuit. Each input pulse causes the reversal of one tunnel diode. The voltage drop appearing at the series connection of the tunnel diodes then serves as a measurement for indicating the number of stored pulses. After all of the tunnel diodes have been reversed, the trigger circuit will be capable of assuming the other position upon arrival of the next pulse. In the course of this, an output pulse may be transmitted. The resetting of the trigger circuit is then affected upon arrival of the next pulse. Also in this case it is again possible to obtain an output signal. Based on this basic principle it is possible to design various types of storage arrangements.

Figure 2:
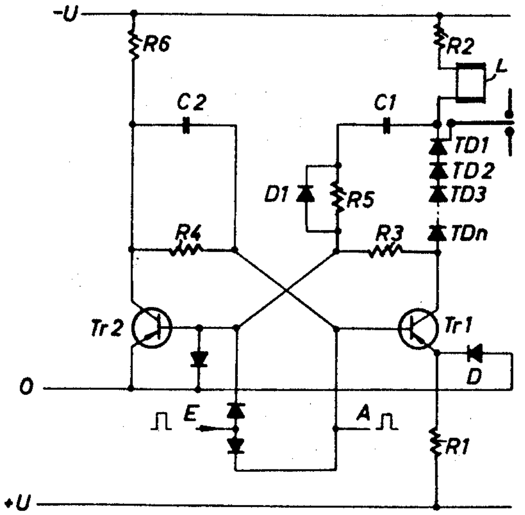
FIG. 2 shows a multistable storage device comprising a series connection of tunnel diodes having different peak currents.

FIG. 2 shows the exemplified embodiment of a multistable storage device according to the invention. The circuit arrangement comprising the transistors Tr1 and Tr2 has D.C. feedback, and includes all the features of a flip-flop stage arranged in a frequency-dividing network.

The series connection of the tunnel diodes is supplied by the transistor Tr1. This transistor is responsive to the A-type operation, and is switched between two current values. If the transistor Tr2 is conducting, then the base electrode of transistor Tr1 has practically zero potential. The emitter electrode of transistor Tr1 is slightly positive, so that the diode D is operated in the backward direction. The collector current of Tr1, that is, the basic current impressed upon the series connection, has a value which is determined by the voltage +U and by the resistor R1. This current JE is so dimensioned as to be greater than the greatest valley current JT of the tunnel diodes TD1 . . . TD$n$, but smaller than the smallest appearing peak current JH. By way of this arrangement each of the tunnel diodes is held at one of the stable working points A or B, independently of the condition of the other tunnel diodes. In the case of a blocked transistor Tr2, the base electrode of Tr1 becomes negative and, consequently, also the emitter electrode until the diode D becomes effective in the forward direction and eliminates the positive feedback effect of R1. Now the transistor Tr1 behaves like a switching transistor in an emitter arrangement.

With the transistor Tr2 in its conducting state, the trigger circuit is assumed to be in its normal condition; in this condition the transistor Tr1 supplies the necessary basic current JE. All of the tunnel diodes are set to the stable working point A. The capacitors C1 and C2 of the trigger circuit partly perform the function of the memory capacitors used in frequency-dividing types of flip-flop circuits. The capacitor C2 approximately has the charge zero, whereas the side of the capacitor C1 facing the base electrode of transistor Tr2 is charged to a strongly positive condition. The incoming storage pulse is short and only slightly positive. Under certain circumstances this may also be achieved by a correspondingly dimensioned timing circuit arranged in the input E of the trigger circuit, whenever these requirements are not already being met by the incoming pulses. During the pulsing time, the transistor Tr2 becomes nonconducting (blocked). The positive input pulse also has a weakening effect upon the current passing through the transistor Tr1. However, in order to maintain the condition of the series connection of the tunnel diodes, the current flowing in this circuit may not drop below the value of the highest valley current. Subsequently to the dying-down of the input pulse, the transistor Tr1 will become fully conductive in the conventional manner by the charge asymmetry of the capacitors, whereas the transistor Tr2 will remain in its non-conducting state. Since the inductance L, arranged in the output circuit of the transistor, counteracts a rapid current variation in the series connection of the tunnel diodes, a rapid switching is performed by the transistor Tr1, but the current in the series circuit increases more slowly. By correspondingly dimensioning the combination R3, R5, C1 it can be insured that the capacitor C1 is practically completely discharged before the current in the series circuit reaches the smallest appearing peak current JH, e.g., that of the tunnel diode TD1. When exceeding this current value, the voltage drop at the tunnel diode TD1 will jump by about 0.5 . . . 1.0 volt, depending on the material of which the employed tunnel diodes are made. Since the inductance L tends to maintain the momentary value of the current, the major portion of the current passes via the capacitor C1 to the base electrode of transistor Tr2, because the tunnel diode performing the voltage jump represents a relatively high resistance. The base electrode of transistor Tr2 is overdriven, and the trigger circuit returns to its normal condition. Since the operating condition only lasts a short time, namely until reaching the corresponding peak-current value, the capacitor C2 has only been charged to a very small extent. Accordingly, only a small positive pulse will appear at the output A after the transistor Tr2 has been rendered conducting, this positive pulse being insufficient for reversing any similar type of storage arrangement which might be arranged subsequently thereto.

Upon arrival of further input pulses, this process is repeated until the tunnel diode with the highest peak current has been transferred to the stable working point B. Upon the jump in the voltage drop at this tunnel diode, the trigger circuit is again reset to the normal condition. In the case of $n$ series-connected tunnel diodes, the transistor Tr1 will remain conducting at the $(n+1)$-st pulse, because no voltage jump is produced in the series connection. If the inductance L is constituted by the operating coil of a relay, then this relay will operate, and will indicate that the storage device has reached its final condition. The mechanical inertia of the relay armature, when correspondingly dimensioning the storage arrangement, will be sufficient to insure that the relay actually only responds or operates when the storage device has reached its final condition.

By choosing the maximum frequency of the control pulses such that the capacitor C2 is permitted to be charged positively on its side facing the base electrode of transistor Tr1, during the interval between two pulses, then the resetting of the storage arrangement can also only be effected by the $(n+2)$-nd pulse. The capacitor C2 is practically charged to the value —U. For this reason, the trigger circuit will be triggered back to the normal condition upon arrival of the next input pulse, in the course of which the transistor Tr2 will again become unblocked (conducting) and the transistor Tr1 will be momentarily blocked by the discharge pulse from the capacitor C2, so that all of the tunnel diodes are switched off. At the same time, the discharge pulse will appear as a big positive output signal at the output A. Upon termination o fthe discharge pulse, the transistor Tr1 will again supply the basic current JE, so that all tunnel diodes will assume their operating points A.

The time condition for recharging the capacitors C1 and C2, which are important with respect to the functioning of the storage device, can be easily adhered to by the insertion of non-linear resistors (parallel connection consisting of a resistor and of a diode) in series with the capacitors.

In the case of a cascade circuit or cascaded arrangement of such types of storage arrangements, the noise signals (interference pulses) appearing at the output A during the storing operation can be easily kept away from the successively following input of the next storage device by providing a simple type of voltage threshold.

These types of storage devices permit the read-out or indication of the storage condition to be performed in a simple way. In this case the voltage drop at the tunnel diode always serves as a measure for the setting of the storage device. In many cases it will be sufficient to measure or evaluate the total voltage drop as appearing at all of the tunnel diodes. The storage arrangement can also be made in such a way that an output signal is not only produced upon reaching the end position of the storage device, but that an output signal can also be obtained in any random position of the storage device. To this end, only the voltage jump of the respective tunnel diode needs to be evaluated and blanked-out separately. It also appears to be conceivable to perform a resetting of the storage devices randomly upon reaching a certain (predetermined) position. This can be effected in a simple way by changing or varying the counting rate, which may be caused by shorting one or more of the tunnel diodes. Upon the series connection of the tunnel diodes there may also be impressed a current greater than the peak currents of some of these tunnel diodes. In this way the storage device is previously set to a predetermined storage position. It is still to be pointed out that the peak currents of the employed tunnel diodes only need to be different, and do not necessarily need to be subdivided within certain stages.

What is claimed is:

1. A multistable flip-flop storage device for actuation by a series of input pulses, said storage device comprising a series connection of several tunnel diodes characterized by various respective peak and valley currents; a first transistor through which a basic current can be impressed upon said series connection of tunnel diodes, said basic current being greater than the greatest respective valley current but smaller than the smallest respective peak current of all said series-connected tunnel diodes; a second transistor which is conducting in its normal condition, said second transistor having its collector coupled to the base of said first transistor and its base coupled to the collector of said first transistor; means for supplying said basic current to said series connection of tunnel diodes, thereby to produce a voltage jump within said series connection when the current therein rises in excess of the peak current of any of said tunnel diodes; and means for applying input pulses to the respective base electrodes of said first and second transistors whereby said voltage jump within said series connection of tunnel diodes produces an output signal from said flip-flop storage device only after the occurrence of a predetermined number of said input pulses.

2. A multistable flip-flop storage device in accordance with claim 1 in which an input pulse causes said first transistor to become fully conducting and said second transistor to be non-conducting, and in which the current increase in said series connection of tunnel diodes is delayed by means of a time-delay circuit.

3. A multistable flip-flop storage device in accordance with claim 1, further including a capacitor coupled between one terminal of said series connection of tunnel diodes and said base electrode of said second transistor, whereby the achievement of a peak current value of a non-switched tunnel diode in said series connection by the current flowing through said tunnel diode causes a voltage jump appearing in said series connection of tunnel diodes to be coupled through said capacitor to reset said second transistor.

4. A multistable flip-flop storage device in accordance with claim 3 in which said first transistor is coupled to said series connection of tunnel diodes to supply to said series connection said basic current upon the resetting of said second transistor to its conducting state.

5. A multistable flip-flop storage device in accordance with claim 2 in which said time-delay circuit comprises a relay control winding for operating an associated relay only when the current in said series connection of tunnel diodes assumes its final value after the occurrence of the final pulse of said series of input pulses and only in the absence of a resetting of said second transistor of said flip-flop storage device to its normal conducting state.

6. A multistable flip-flop storage device in accordance with claim 5 in which the resetting of said second transistor of said flip-flop storage device to its normal conducting state can be effected by the blocking of said first transistor and by the disconnection of said basic current flowing in said series connection of tunnel diodes.

References Cited by the Examiner

UNITED STATES PATENTS

| | | |
|---|---|---|
| 3,050,637 | 8/62 | Kaufman. |
| 3,089,039 | 5/63 | Abraham. |
| 3,094,630 | 6/63 | Rapp et al. |
| 3,094,631 | 6/63 | Davis. |

OTHER REFERENCES

Miller et al.: "The Tunnel Diode as a Storage Element," Session V: Information Storage Techniques, Digest of Technical Papers, 1960 International Solid-State Circuits Conference, February 11, 1960, pages 52 and 53.

SAMUEL BERNSTEIN, *Primary Examiner.*